(12) United States Patent
Engelke et al.

(10) Patent No.: US 6,431,096 B1
(45) Date of Patent: Aug. 13, 2002

(54) METHOD AND SYSTEM FOR HIGH PRESSURE LIQUID INJECTION OF TURF SEED

(75) Inventors: Milton C. Engelke, Parker; Kevin E. Kenworthy, Stephenville, both of TX (US); Laurence B. Jones, Caledonia, WI (US)

(73) Assignee: Textron Inc., Providence, RI (US)

( * ) Notice: Subject to any disclaimer, the term of this patent is extended or adjusted under 35 U.S.C. 154(b) by 0 days.

(21) Appl. No.: 09/679,319

(22) Filed: Oct. 4, 2000

Related U.S. Application Data

(60) Provisional application No. 60/157,557, filed on Oct. 4, 1999.

(51) Int. Cl.[7] .......................... A01G 25/16; A01C 23/04
(52) U.S. Cl. ........................................ 111/127; 222/61
(58) Field of Search ................... 111/118, 127, 111/200, 129, 149, 85, 86, 87; 239/726, 727, 728; 222/61, 397, 400.5

(56) References Cited

U.S. PATENT DOCUMENTS

| | | |
|---|---|---|
| 2,424,520 A | 7/1947 | Tonkin |
| 2,930,334 A | 3/1960 | Marron et al. |
| 2,988,025 A | 6/1961 | Johnston |
| 3,012,526 A | 12/1961 | Baldwin et al. |
| 3,815,525 A | 6/1974 | Kainson et al. |
| 3,883,075 A | 5/1975 | Edney |
| 3,920,184 A * | 11/1975 | Waldrum ...................... 239/10 |
| 3,926,131 A | 12/1975 | Collins |
| 4,009,666 A | 3/1977 | Russell et al. |
| 4,034,686 A | 7/1977 | Collins |
| 4,300,461 A * | 11/1981 | Hodge et al. ............... 111/106 |
| 4,970,973 A | 11/1990 | Lyle et al. |
| 5,487,346 A | 1/1996 | Taylor |
| 5,524,821 A | 6/1996 | Yie et al. |
| 5,641,025 A | 6/1997 | Kawaguchi |

* cited by examiner

Primary Examiner—Robert E. Pezzuto
(74) Attorney, Agent, or Firm—Harness, Dickey & Pierce, P.L.C.

(57) ABSTRACT

A turf care system and method for injecting a liquid/seed mixture into soil, such as the crown of an established turf stand, using simultaneously fired pulses of high-pressure liquid jets of the mixture shot toward the ground. The liquid, typically water, is mixed with dry grass seed shortly before being delivered to a high-pressure liquid/seed pumping system, which uses an accumulator and sequencing valve to produce at regular repetitive intervals pulses of the liquid/seed mixture under high pressure. These pulses are delivered to an elongated hydraulic manifold having multiple nozzles pointed downwardly, which are spaced from one another and the ground by predetermined distances. The momentum of the high-pressure jet of liquid/seed mixture issuing from each nozzle cuts through overlying vegetation to deposit the seeds into the crown of the soil at predetermined desired depth. Spray patterns are determined by nozzle orifice shape, and are preferably selected to provide a shallow knife slit-like opening or trench in the crown of the turf. The seeds come to rest near the trench bottom, thus providing good soil-to-seed contact and good light. The trench also collects water and nutrients. The adjacent and underlying turf stand provides excellent physical protection for the soon-to-germinate seeds and resulting seedlings. This liquid/seed injection system and method for planting turf grass seeds has several beneficial results, including ease-of-use, reduced time and effort to plant seeds, reduced energy requirements, and reduced disruption to the surface of the turf or soil in comparison to other methods of interseeding turf.

27 Claims, 8 Drawing Sheets

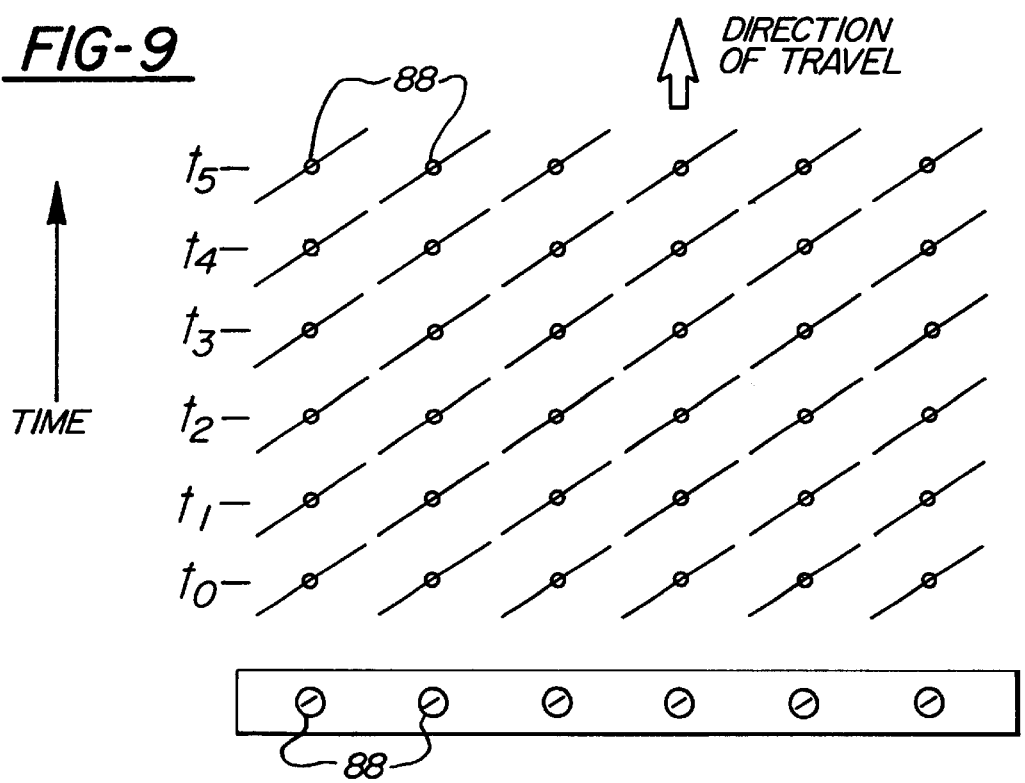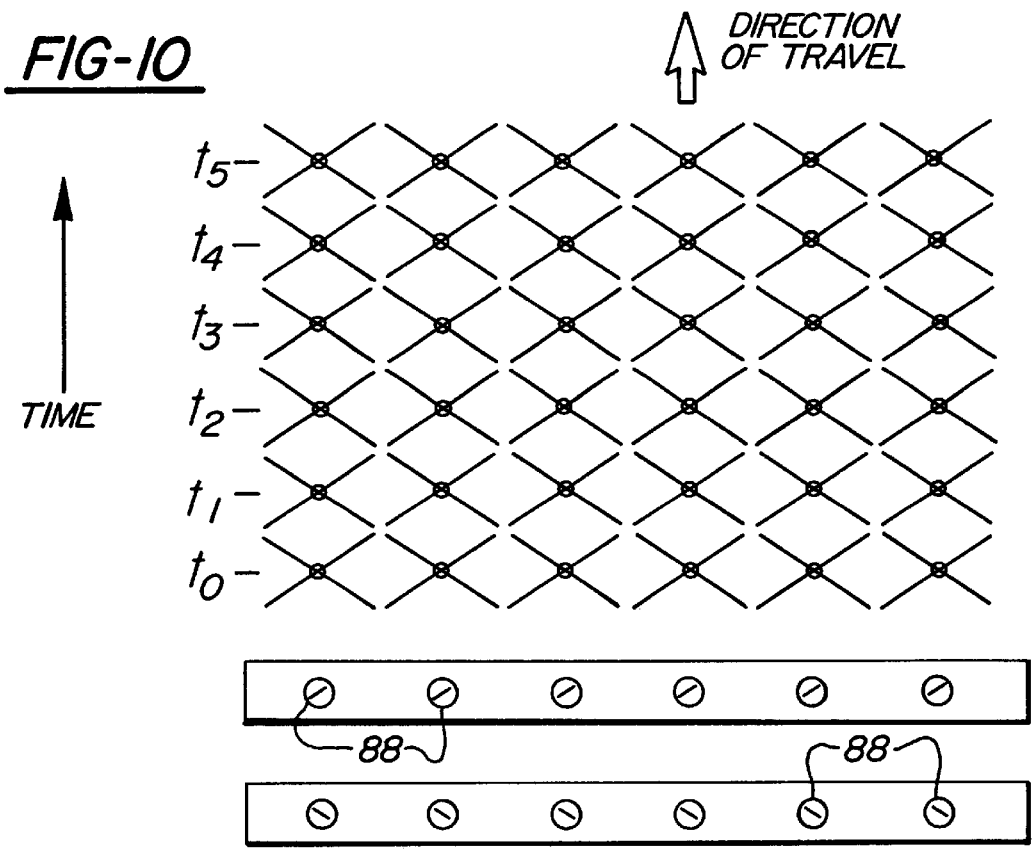

METHOD AND SYSTEM FOR HIGH PRESSURE LIQUID INJECTION OF TURF SEED

CROSS-REFERENCE TO RELATED APPLICATIONS

This application claims priority to United States Provisional Patent Application No. 60/157,557, filed on Oct. 4, 1999.

TECHNICAL FIELD

The present invention generally relates to turf care methods and systems for injecting seeds into the turf or soil using pressurized liquid, and in particular to methods and systems for taking a liquid-seed mixture, pressurizing it, and injecting it under pressure into the crown area of an established stand of turf.

BACKGROUND OF THE INVENTION

The release of several new grass cultivars with higher shoot density, finer texture, and greater tolerance to environmental stresses has led many golf course superintendents to think about how best to introduce these new cultivars into their greens, tee-boxes and fairways. There are two primary methods of introducing a new grass species into an established turf grass stand: total renovation and interseeding. It is traditionally thought that the most effective means to replace an old grass cultivar with a new one is through total renovation. This consists of killing or removing the established turf grass and then reestablishing the area with a new cultivar. The downside to this approach is the requirement to close the greens or fairway until the new turf is established. The reestablishing process normally takes at least a few weeks and could last as long as several months, during which time significant loss of play and hence revenue would occur.

An alternative method to total renovation of greens is a practice that is known as interseeding. In interseeding, the new, desired cultivar is introduced into an established stand of grass over a period of time. The desired result is a gradual conversion of the existing putting green, tee-box or fairway surface from that of an older cultivar to one containing the desired cultivar without as serious a disruption to the playing surface.

Traditionally, the practices used in interseeding are similar to or adapted from practices used to overseed bermuda grass greens with a cool-season turf grass during the autumn. Generally, interseeding practices consist of trying to provide the best seed-to-soil contact possible without totally destroying the established turf surface. Verticutting, aerification with multiple small incisions, solid and/or hollow tine coring, and top dressing are used in various combinations in interseeding programs. The intensity of most of these practices is generally not severe enough to significantly disrupt or limit play. Practices that attempt to limit the competitiveness of the established turf, such as using plant growth regulators or mowing at a shorter height of cut, may also be used.

Traditionally, following the mechanical preparation, the desired cultivar is broadcast or slit-seeded into the stand. The seeding rate, in many cases, is higher than the normally recommended rates for establishment. Within a few weeks of seeding, small seedlings are observed.

Unfortunately, the germinating seeds often have a difficult time competing with the existing grass population for light, water and nutrients. Currently, it is thought that in order for interseeding to be successful, the established turf grass stand would have to be severely stressed and/or a significant amount of the turf grass canopy removed. Practices such as a severe scalping of the turf may be used to reduce the competitiveness of the established turf, which often is a bent grass, to a level that the desired cultivar would have a chance. Practices that destroy the turf canopy and create open spaces generally help reduce competition from the existing bent grass plants to allow the new seedlings to have a better chance of successful development. Given the significant and the continuing amount of work that has to be done in a given area to interseed successfully, many believe that the introduction of a new cultivar is best or most expeditiously accomplished through total renovation.

In the science of turf care, many methods have been suggested which improve germination rates as well as improve survivability of established turf grasses. Many of these methods relate to bringing additional nutrients to the root zone of the grass to efficiently aid in the growth of the turf. It has long been understood that liquids can be injected into soils to reach the root zone. The injection of liquids provides a mechanism to introduce water, nutrients, fungicides, and/or pesticides into the ground and further provides a means for aeration of the soil, which also aids turf growth. A number of exemplary U.S. patents describe and illustrate such processes and equipment.

U.S. Pat. No. 4,009,666 to Russell et al. discloses an apparatus for injecting fluid below a soil or turf surface. The apparatus is comprised of a plurality of nozzles carried by a support rod; each nozzle forms a stream of fluid passing therethrough has a low friction contact surface for contacting the surface of the soil. The apparatus is provided with a pump that cooperates with the nozzle to inject fluid substantially below the soil surface.

U.S. Pat. No. 4,807,544 to Cross et al. discloses an apparatus for injecting agro-chemicals into the subsurface of the soil without tilling the soil. The high pressure pump delivers the solution to be injected into a series of injection nozzles that cause liquid jets to be formed that have sufficient velocity and narrow cross-section to inject into the soil. Included in the design is a shield-pan that minimizes clogging of the nozzles.

U.S. Pat. No. 5,407,134 to Thompson et al. discloses a liquid distribution system having a pair of variable displacement pumps for mixing chemicals and water to a desired proportion and delivering the solution to an open furrow just prior to the furrow being covered with soil.

U.S. Pat. No. 5,487,346 to Taylor discloses an apparatus for intermittently injecting liquid into soil at pressures as high as 1200 PSI and at desired flow rates of between 6 and 60 gallons per minute. An accumulator and sequencing valve is used to control the amount of fluids being injected into the ground. (Note that the apparatus shown in this patent is also shown in FIG. 1 herein.)

U.S. Pat. No. 5,503,091 to Foster et al. discloses a turf conditioning machine which disperses a high pressure stream of fluid into the ground in a vertically-aligned cylindrically-shaped drilling hole. The holes are drilled using a hydrated polymer that has absorbed and thus will release moisture in a controlled fashion.

U.S. Pat. No. 5,741,090 to Dunning et al. discloses a system and method for injecting liquids and solids into the earth. The system discloses a setup wherein only the liquid is run through the main pump while a liquid solid slurry is stored and moved to join the liquid under pressure by a chemical injector pump. A displacement wheel commands solenoid valves for pulsing the pressurized liquid into the ground surface.

Several U.S. patents disclose methods for injecting seeds or particulate matter mixed with a fluid into the ground typically through the use of a pressurized steam of liquid. Exemplary patents include the following.

U.S. Pat. No. 4,145,980 to Boots discloses an automatic seeder for planting tiny seeds at a given depth and at evenly spaced intervals. The apparatus utilizes a plurality of furrow creating mechanisms that are arranged to create furrows of a consistent desired depth in front of the seed discharging means. A spray arrangement is used to cover the disbursed seeds with water.

U.S. Pat. No. 4,218,855 to Wemmer discloses a particulate spray nozzle having an internal mixing-chamber with a liquid spray orifice. When a liquid is sprayed through the liquid supply orifice, particulate matter is drawn into the mixing chamber by a venturi facilitating the mixing of the dry material with the liquid. This material is ejected through a port on one side of the mixing chamber.

U.S. Pat. No. 4,224,889 to Cruse discloses an apparatus for sowing seeds in a liquid suspension. The liquid seed combination is discharged behind the plowshare into a furrow.

It is also known and has been shown to inject single seeds into turf or ground. U.S. Pat. No. 4,899,672 to Paul discloses a method for sowing separate seeds in a furrow made by a plowshare. The device, which trails the plowshare, traps a single seed and injects it through a nozzle into a furrow before the furrow is closed.

U.S. Pat. No. 5,303,663 to Salstrom discloses a method and apparatus for discharging water absorbent polymers into a "blank" near the root zone of a crop plant.

U.S. Pat. No. 5,394,812 to Dunning et al. discloses an apparatus and method for dispensing a substance such as a hydrophylic polymer into a soil to minimize the need for repeated irrigation. The apparatus is contained on a trailer that supports a mixing tank within which the polymer and liquid are continuously agitated. The mixture, in a liquid form is sent through a pump to an outlet having a plurality of apertures communicating with the tank via a manifold. A series of valves operates such that high pressure pulses of the liquid polymer mixture are discharged with sufficient velocity that the slugs of material are discharged under the soil. There are still other fluid and fluid particulate injection systems, beyond those disclosed above, that utilize a venturi to mix particulate materials with fluids and inject them into the ground.

Common among all of these, to our knowledge is a lack of a system with the capability of simultaneously planting seeds by high-pressure liquid injection over a dispersed area. Further, to our knowledge, no one has used a high-pressure liquid injection system for planting seeds into an established stand of turf.

Accordingly, there is still a need for more efficient methods and systems for planting seeds into the crown area of an established stand of turf for interseeding purposes. In particular, there is a continuing need for easy-to-use, inexpensive-to-operate and non-complicated methods and systems for safely and easily accomplishing seeding of existing grass areas with less disruption to the playing surfaces to be seeded. Preferably such new methods and systems should produce near optimal results in terms of achieving desired depth of seed placement into the soil and achieving successful seed germination rates and seedling growth. Also, on a more general level, there is a continuing need to find improved methods and systems for planting seeds over large areas with less effort, reduced expenditure of energy, and reduced minimal disruption to the existing turf, vegetation or soil to be planted.

Thus, objects of the present invention include providing:

(1) a liquid/seed injection ("LSI") system and method for simultaneously injecting multiple seeds into the turf or ground to a desired planting depth over a distributed area using high-pressure ("HP");

(2) a high-pressure liquid seed injection ("HP-LSI") system and method which, by the way it works, helps protects the seeds from physical damage during and after planting;

(3) an HP-LSI planting system and method which can be used to interseed, that is, plant within an existing well-established turf population;

(4) an HP-LSI planting system and method which permits a gradual, timed, introduction of new seeds into existing stands with minimal surface disruption;

(5) an HP-LSI planting system and method which allows for the planting of seeds without mechanical tillage of the soil and/or soil cover;

(6) an LSI planting system and method where the mixing of the dry seeds and the liquid can be easily and quickly accomplished in one location shortly before injection;

(7) an LSI planting system and method which subjects the coat of the seeds to be planted to an agronomically acceptable and desirable amount of scarification; and (8) an LSI planting system and method which reduces the amount of energy and water needed to plant seeds;

(9) an LSI planting system and method which enables a large batch of seeds to be efficiently and automatically planted at a desired depth into soil over a large area, with the multiple seeds being planted simultaneously in a predetermined pattern and with the pattern being repeated and spaced at predetermined intervals from one another; and

(10) a new application for the basic high-pressure liquid pumping and injection systems now being used for high-pressure injection of liquid-soluble fertilizers, pesticides and the like, but not heretofore modified and arranged to plant seeds, thus helping make such injection equipment more versatile.

SUMMARY OF THE INVENTION

To address the foregoing needs and achieve one or more of the foregoing objectives, there is provided, according to a first aspect of the present invention, a high-pressure liquid seed/injection system for simultaneously injecting multiple jets of a liquid/seed mixture into the ground, such as the crown of an established stand of turf, or barren or cultivated soil. The jets of liquid/seed mixture are preferably sprayed out of nozzles that each have an opening which provides a predetermined sprayed pattern, such as a dashed straight line, circle, cross or oval.

Provides a seed-planting system including machinery having an accumulator for storing a seed-fluid mixture under pressure coupled to a nozzle. The machine further contains a pump for increasing the pressure of the seed-fluid mixture and a mechanism for regulating the flow of the seed-fluid mixture from the accumulator to the nozzle. In accordance with a first aspect of the present invention, a seed injection system is provided for injecting seed into barren soil or for interseeding into existing crops. The seed-fluid injecting machine preferably comprises: a nozzle, which has a fan or conical distribution pattern; and an accumulator for storing the seed mixture under pressure coupled to a nozzle. A plurality of nozzles are evenly distributed along a manifold which accepts the pressurized fluid from the accumulator. The manifold and nozzles are suspended above the ground at a distance which allows for the maximum distribution of the seed-fluid mixture while preventing the injection jets from overlapping size and its orifice pattern.

The distribution pattern of the jets is tailored to cause a proper spatial and depth distribution of the seeds in the turf crown or soil to be seeded. This distribution of the liquid/seed mixture is a function of nozzle size, spray pattern, accumulator size, system pressure settings and soil conditions. For use in an interseeding operation, the nozzles preferably have a fan or cone-shaped spatial distribution pattern. One preferred form and arrangement of the fan-spray nozzles allows for a distribution or injection pattern of the seed-liquid mixture along a straight line in the form of dashes. These dashed lines are preferably spaced at even intervals along the surface of the area to be reseeded. In interseeding applications, other spray pattern configurations are usable. It is preferable that the spray patterns do not overlap before they hit the ground.

The LSI machine or system is mounted on the back of a small off-road utility truck with large tires such as a Cushman Turf-Truckster ("Vehicle"), which features a powered takeoff ("PTO") shaft which is available to drive the mixing paddles and the drive shaft of the piston pump found in the unit. This LSI machine or system, which at times is referred to as a unit, is preferably set up to fire at pressures up to 3600 PSI. In other words, the sequencer valve opens at that pressure. If the pressure is increased (by adding additional Belleville springs to the sequencer valve), the energy of the liquid as it leaves the nozzle is increased, thus driving the liquid deeper into the soil. A preferred fan spray nozzle produces a spray pattern that covers an area of about 3.5 inches to 4 inches when the nozzles are placed 6 inches above the top level of the soil, and sprayed out in a line.

The preferred unit contains a 6 cubic inch accumulator. There are 6–8 pulses per second typically produced with the 6 cubic inch accumulator. If a larger accumulator is used, such as the 20 cubic inch accumulator, the number of pulses per second is reduced, and more energy and liquid under pressure is stored between shots. The net result, is that each burst of liquid will inject more fluid and inject it more deeply into the soil than is desirable for planting grass seeds.

It is preferable to have 16 nozzles on the manifold, the nozzles being about 42 inches apart. The fan nozzles spray in a spatial distribution for interseeding purposes in what amounts to a straight line. After injection, the treatment looks like the dashes in Morse Code. A typical speed for the small utility truck is 1 to 2 miles per hour. At this speed, the lines of pulses with a 6 inch accumulator are about 2 inches to 2.2 inches apart. This spacing is acceptable because the grass seed injected in the top layer of soil in these parallel line rows will grow toward one another, thus providing the desired coverage.

A typical golf course green is about 7,000 square feet, and can be spray-planted in a single session with about 160 gallons of water provided in the 160 gallon tank on the unit. This spraying operation takes 25 minutes on average, and typically will cover the entire green by traversing the green with the utility truck-mounted turf seed injection system in two orthogonal directions.

The use of a fan spray nozzle allows for a small shallow elongated opening about 4 inches long and ⅛ inch to ¼ inch wide to be created. As will be further explained, the LSI system and method of present invention use the high-pressure bursts or jets of liquid and seed mixtures to cut through existing vegetation and dig this shallow "seed-starter" trench. The maximum depth to which the creeping bent grass, a typical grass seed used on golf courses, should be planted is about ¼ inch. The planting of seeds at depths of greater than ¼ inch significantly reduces the seedling's ability to emerge from the soil surface. Accordingly, the various parameters of the LSI system of the present invention are set or adjusted until the depth of injection into the soil reaches the desired depth. The fan spray nozzle preferably used is a Spraying Systems nozzle tip part No. 1/4 MEG-65054. It is during the formation of this seed-starter trench that the seeds are also injected at high pressure, thus becoming lodged in the crown area of the established turf or top layer of the soil. This high-pressure spray has the beneficial effect of cutting and/or partially clearing away the existing grass blades and root structures, which otherwise might compete against the new grass seedlings. This partial cutting provides a short-lived stunting action to the existing turf stand, which helps inhibit the growth of immediately adjacent existing plants, thus allowing the newly germinating seeds to compete more effectively for light, nutrients and air.

The disruptive effect of producing these shallow trenches in the existing turf fortunately does not seriously disrupt the turf's interwoven turf substructure, so that players and vehicles can still pass over the soil without significant displacement of the turf in one direction or another. The seed is effectively placed in excellent soil/thatch contact where it is provided with moisture and physical soil contact. It is also protected from physical damage by adjacent turf substructure still present on either side of the trench. The adjacent canopy holds moisture and physically protects the newly created seed bed from drying winds and desiccant, thus requiring less frequent irrigation during the germination process. One of the benefits of the seed-planting methods of the present invention is this very shallow depth of cut, which is made only as deep as it needs to be to achieve the desired beneficial results to stimulate rapid germination. The providing of a trench into which water will flow and into which water, nutrients and soil can collect and into which light can enter creates an ideal environment to stimulate and support germinating seed. Heretofore, there was no known way, except the use of mechanical cutting tools like verti-cuts or elongated mechanical tines to achieve selective trenching for overseeding. In addition, there was no practical way of accurately controlling the depth of the trenches or slits produced by those conventional methods. In the present invention, this depth-control occurs automatically through the selection of the proper height of the nozzle above the soil and the spray pattern in combination with the pressure and volume, so as to cut the grass and/upper soil regions to the proper depth.

In denser soil, it is important not to place the grass seed too deep; whereas in less dense soil, a seed placed slightly deeper still has a decent chance of reaching the surface. The pressurized liquid/seed mixture issuing from the nozzles of the liquid-seed injection system inherently penetrates more shallowly into dense soil than into loam or less dense soil. This is because the denser soil more quickly absorbs the kinetic energy or momentum of the jet stream (which is a function of the volume and speed of water injected into the soil). Thus, the present invention provides a self-correcting system and method for placing the seeds at the proper depth, depending upon soil, turf canopy and root structure density.

One of the beneficial effects of the natural dormancy of seeds is that they are normally dry, and therefore typically very hard. It is the presence of water which causes the seed coats to soften in a process known as imbibing or inhibition. In the present grass seed injection process, it is beneficial to put the load of seed to be planted in the mixing tank just before it is to be injected so that it does not have any significant opportunity to imbibe much water and thus become so soft that it would be more susceptible to damage as it travels through the system and is injected into the turf crown or soil. Preferably, creeping bent grass seeds remain in the holding tank no more than twenty minutes before being injected into the ground.

One beneficial effect of the seeds passing through the high pressure pump, manifold, hydraulic lines, fittings, sprayer bar header and nozzles and through the top soil, is that the seed is typically mechanically scarified, meaning that its seed coat is nicked up, or partially cracked or fractured. This agronomically acceptable amount of scarification makes it easier for the seed embryo to imbibe water and nutrients and to germinate through the seed coat, which is an essential factor in the successful part of the embryo growth cycle.

Although the testing to date has been with interseeding over an existing population of established grass having a grass canopy and root structure, the methods and machinery of the present invention can be beneficially used for original seeding as well. Both the fan spray nozzles and the cone nozzles may be used for this purpose. The cone nozzles may work better to the extent that they provide for a more uniform spatial distribution of the grass seeds over an area.

The machinery is particularly well suited for the original seeding process because it comes with an onboard mixing tank. In this way, the seed, fertilizer and any other desired water-soluble constituent such as water-absorbing polymers, can all be placed into the water and kept under agitation to help ensure substantially uniform distribution with the tank.

In testing of the method and machine of the present invention, seed of known quality was used. In other words, the seed batch was pre-tested to ensure that 95% or more of the seeds in the batch were alive at the time the seeds were used. Testing with the fan spray nozzles, 6 inch accumulator and the unit mounted on a utility vehicle show that there is approximately a 25%–27% mortality rate for the creeping bent grass seeds. In other words, 73%–75% of the seeds survived and successfully germinated. Considering seeding rates of 8–16 million bent grass seeds per 1000 square feet, this survival rate is highly acceptable.

The ability of a seed, like a grass seed, to pass through this very hostile mechanical environment where the rate of travel and the impacts are very high and the deceleration is extremely severe (on the order of many g's) is counterintuitive. Yet because the seeds have a dry center rather than a fluid center, there appears to be little or no opportunity for detrimental movement between the embryo and the inner seed coat wall.

BRIEF DESCRIPTION OF THE FIGURES

In the drawings, various embodiments and aspects of the liquid-seed injection system and methods of the present invention are shown. For purposes of illustrating the features and advantages of the present invention, the Figures, in the interest of clarity, at times exaggerate somewhat the size, spacing, clearances and/or relative size of or between certain parts of the seed injecting device. In the various Figures, like numerals indicate similar components or features and the Figures may be briefly described as follows.

FIGS. 4–6 show first, second and third embodiments, respectively, of the spray nozzle configuration and distribution patterns of the present invention, wherein:

FIG. 4 is a perspective view of the first embodiment which includes a number of nozzles distributing the liquid-seed mixture in a parallel fan distribution configuration;

FIG. 5 is a perspective view of the manifold and nozzles showing the nozzles injecting the seed-fluid mixture using a perpendicular fan configuration; and FIG. 6 is a perspective view of the third embodiment which shows the distribution of the fluid-seed mixture using a number of parallel cone spray distributions;

FIGS. 9–12 show alternate spray pattern configurations.

DETAILED DESCRIPTION OF THE PREFERRED EMBODIMENTS

The following detailed description of various embodiments of the seed-fluid injection system of the present invention are presented in a way of example only and are not intended to limit the invention to just those embodiments and methods shown and/or described. This turf seed injection system is intended primarily for use in the turf care industry, but may be used in other agricultural arts such as for the planting of cash crops. The seed-fluid injection device may be viewed as a larger version for injecting larger seeds such as corn or soybeans. These larger devices would of course be adapted by the use of larger accumulators and/or nozzle heads to accommodate the larger seeds and planting depths. Thus, the overall scope of my invention here should be understood to encompass the adaptations, variations, alternatives and different uses of the device that are described herein or are logically derived from the teachings herein. The fluid-seed injecting device disclosed herein has structures dedicated towards a single manifold with a number of nozzles attached thereon. It should be understood that a plurality of accumulators coupled to the nozzles as well as the possibility of a number of individual manifolds is envisioned. Those in the art should appreciate that the descriptions herein of the liquid distribution system will also serve to describe proportionally larger units for use with seed planted cash crops.

Figure 1:
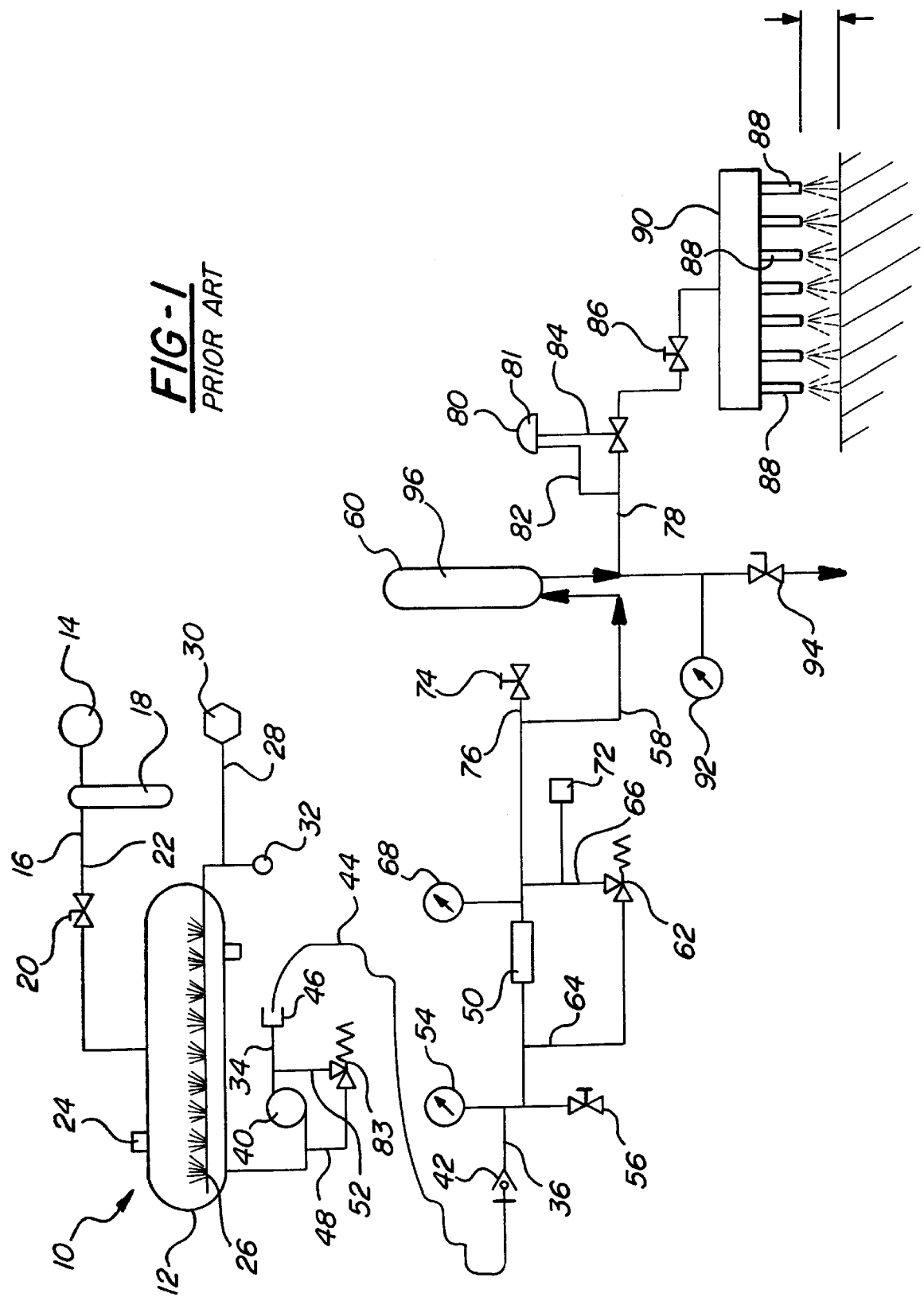
FIG. 1 shows a liquid injection system as is known in the prior art.

The prior art system as shown in FIG. 1 of U.S. Pat. No. 5,487,346 to Taylor, has a holding tank 12 (preferably a vented tank to inhibit over-pressurization) for holding water and/or water with pesticides, fertilizers or similar material to be injected into soil. Water is supplied to tank 12 from a water supply source 14 through flow line 16. Preferably the water is passed through a fairly fine filter 18 to remove any debris that might be present in the water so as to help avoid obstructing the relatively small orifices in the lines and nozzles downstream. The above-mentioned materials to be added to the tank are added either to fluid supply source 14, into flow line 16 at point 22, or into tank 12 through inlet 24. Valve 20 controls flow in line 16.

Air under pressure is supplied into the tank from manifold 26 with multiple air outlet holes through flow line 28 from air compressor 30. Gauge 32 indicates air pressure in flow line 28. This pressurized air helps to mix fluid and materials in tank 12, and may be supplied at about 120 p.s.i. (Note all pressure valves used set forth herein are expressed as p.s.i.g.)

Transfer pump 40 pumps fluid through flow line 34 to flow line 36 for introduction to triplex pump 50. In a tractor-mounted (or truck-mounted) system according to the present invention, items forward from and including connection 42 are mounted on the tractor (or truck) (not shown). Hose 44 interconnects two flow lines 34 and 36 at connections 42 and 46.

Flow lines 34 and 36 may be relieved by through line 48 by relief valve 83. Valve 83 provides relief of flow line 34 via an interconnection with it through flow line 52 and to flow line 36 via interconnection with flow line 44 (e.g., a hose). In one embodiment, relief valve 83 is set to open at a line pressure of between about 30 and 75 p.s.i. (e.g., when the inlet of the pump 50 has a maximum inlet rating of 80 p.s.i.).

Gauge 54 indicates fluid pressure in flow line 36. Inlet drain valve 56 provides for draining and testing the system.

Triplex pump 50 pumps fluid at a relatively high pressure through flow line 58 to accumulator 60. Relief/dump valve 62 provides relief to flow lines 76 and 58 via flow lines 64 and 66. Valve 62 acts as a relief valve for over-pressurization protection and as an automatic dump valve when valve 86 on the tractor unit is placed in an OFF position. Valve 62 will remain in an open (dump) position until valve 86 is placed in an ON position for injection. Gauge 68 indicates line pressure in flow line 58. For added safety, high pressure rupture disc assembly 72, e.g., with a disc that ruptures at a pressure of e.g. about 6500 p.s.i., is interconnected with the outlet side of triplex pump 50 to provide quick pressure relief in the event of a failure of valve 62. (The disc may be constructed to rupture at some pressure reasonably above the normal expected operating pressures.) Valve 74 in fluid communication with flow line 58 via flow line 76 provides for bleeding of fluid for pump 50, relieving pressure on the pump discharge. The motor on pump 50 will not start under a load.

A charge of a volume of fluid under pressure, pumped by triplex pump 50 into accumulator 60, builds up in accumulator 60 and in flow line 78 until sequence control valve 80 with diaphragm 81 senses, via sensing line 82, that a pre-set line pressure has been reached. At this point valve 80 opens allowing the accumulated fluid charge to flow through a flow line 84 to a tractor-mounted nozzle apparatus 90. The accumulator contains an amount of a gas, e.g., nitrogen gas 96. An on/off adjustable control valve 86 operable from a tractor, controls flow in line 84. Nozzle apparatus 90 has a plurality of nozzles 88.

Gauge 92, e.g., mounted on the tractor, indicates the level of line pressure in flow line 78. Manually-operable drain and balancing valve 94 permits draining and testing of the system.

Figure 2:
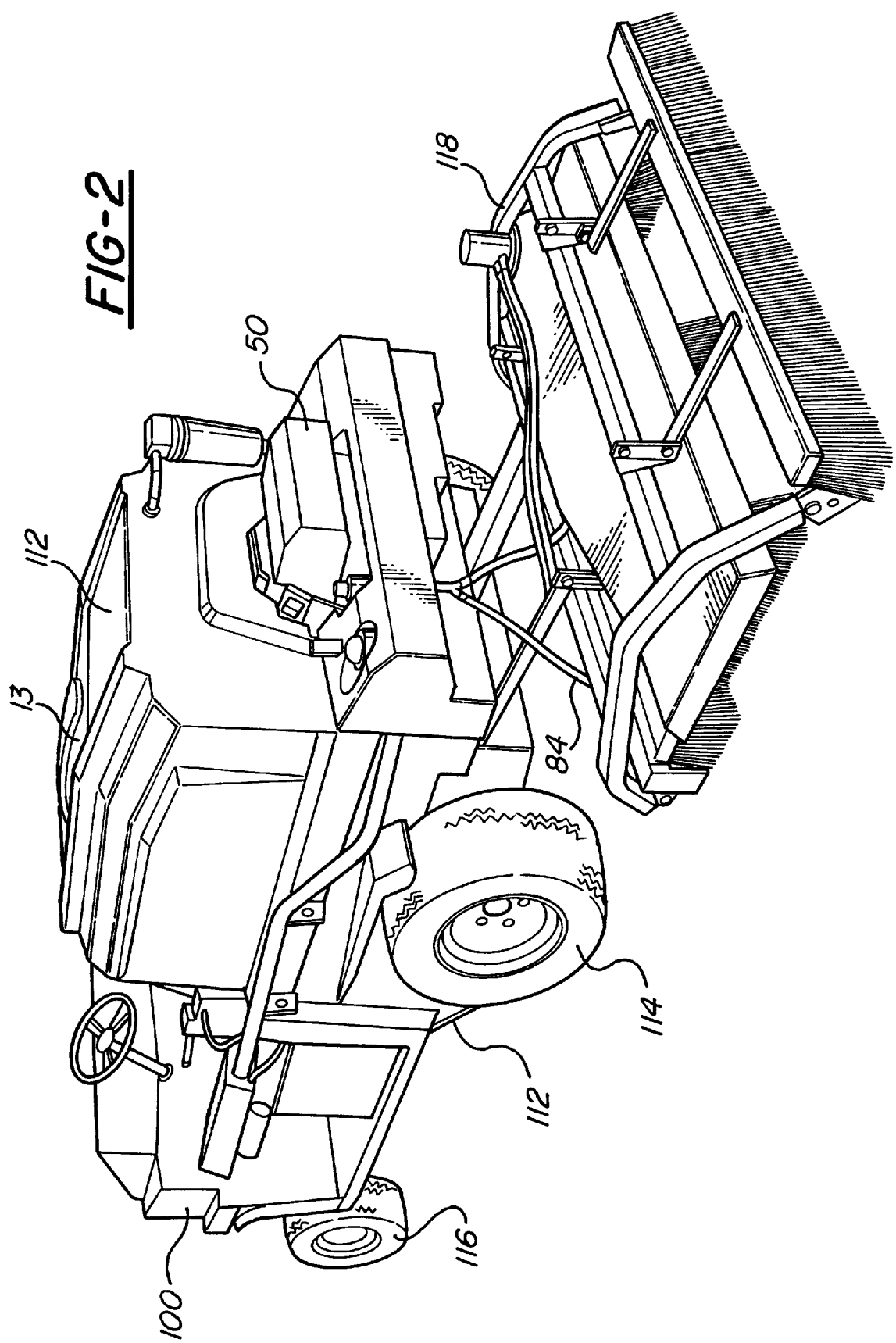
FIG. 2 shows a view of the seed-liquid injection system mounted on a conventional small off-road utility truck.

FIG. 2 illustrates a general arrangement of the utility vehicle having the turf care machinery and system of the present invention attached. Utility vehicle 100 includes frame and 112 supported for movement on rear drive wheels 114 and steerable front wheels 116. Injection assembly 118 is shown fixed to the back of utility vehicle 100. Manifold assembly 90 (not shown) is within injection assembly 118 and held 6 inches (about 15 cm) above the turf. Manifold assembly 90 is fluidly coupled to the injection pump 50 by high pressure hose 84.

Utility vehicle 100 carries a 160 gallon storage tank 112 and a pump set to discharge 8 gallons per minute. The 8 gallons per minute is a flow rate associated with the pump engine being set to run at a certain RPM. When run at this speed, the unit produces pulses 2–3 inches apart.

Mechanical agitator 13 is provided in storage tank 12 that allows the seeds to be maintained in a suspension in a substantially density (i.e., number of seeds/unit volume) in the liquid. In general, a uniform distribution of the seeds in the tank is desirable, although the tank which has less liquid typically contains a higher concentration of seeds. The seeding operation is carried out by moving continuously across the seeding area since if one stops, there would be multiple pulses delivered in the same location, if the injection is not turned off first. It is envisioned that it is possible to correlate the firing of the pulses to rotation of the utility vehicles wheels to prevent this problem. Typically, shutoff mechanisms can be provided for the pump 50 to stop its pumping when the pressure in the accumulator 60 is reached but the sensors determine it is not desirable to discharge the liquid-seed mixture. This can be accomplished for example by simply turning off the PTO, which is engaged and disengaged by a clutch.

Figure 3:
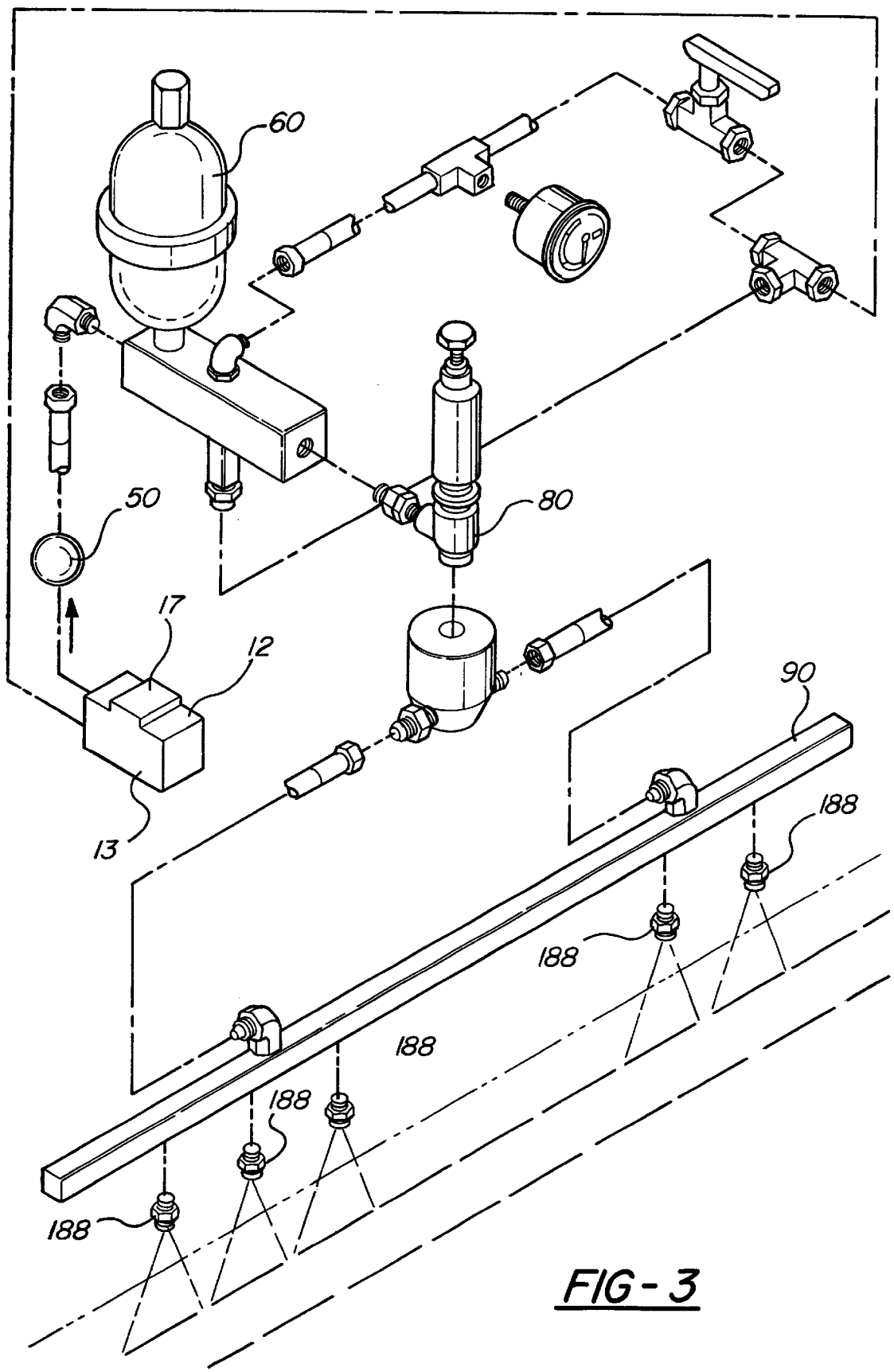
FIG. 3 shows an exploded view of the liquid distribution system of the present invention.
Figure 3A:
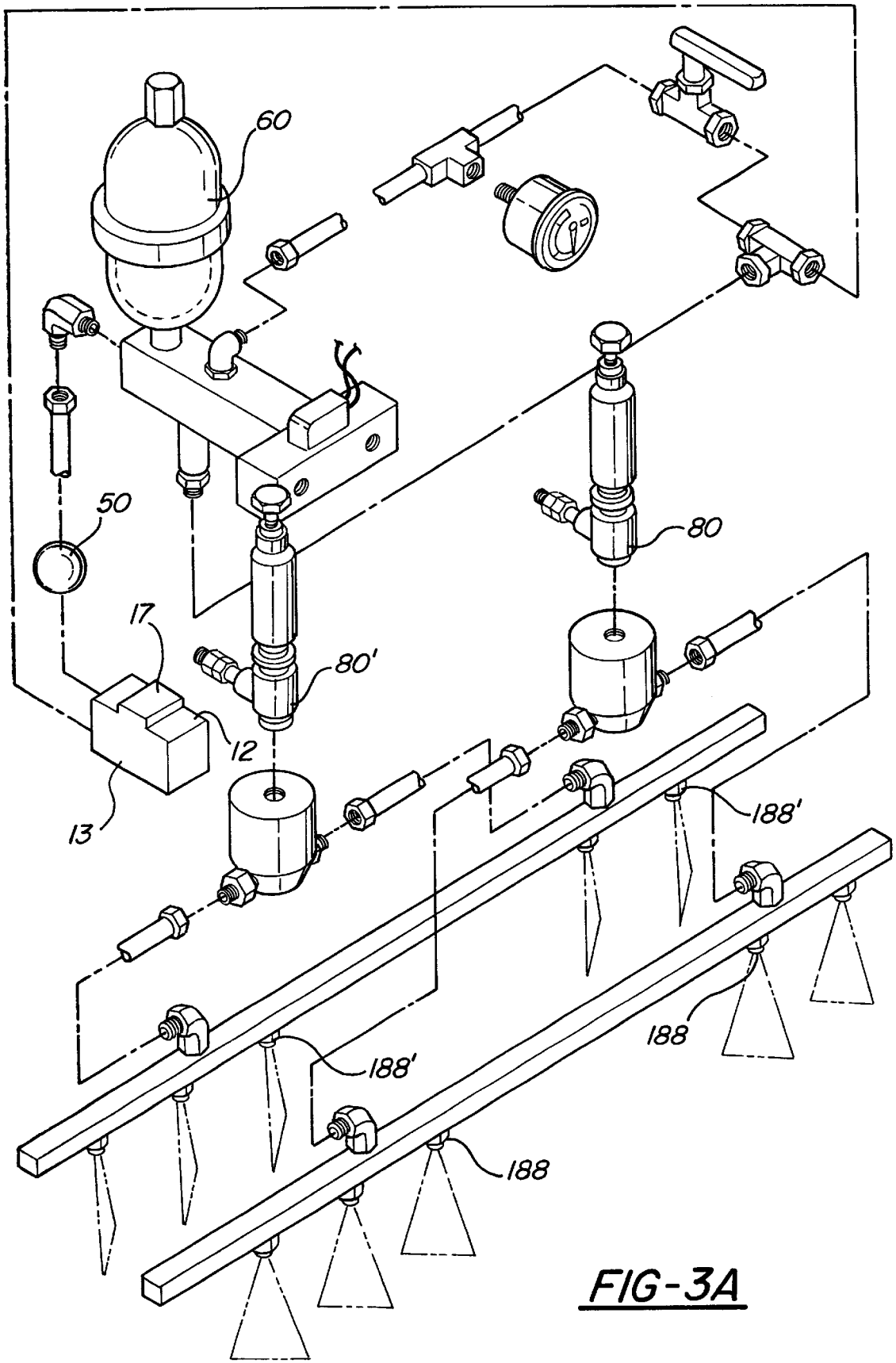
Figure 4:
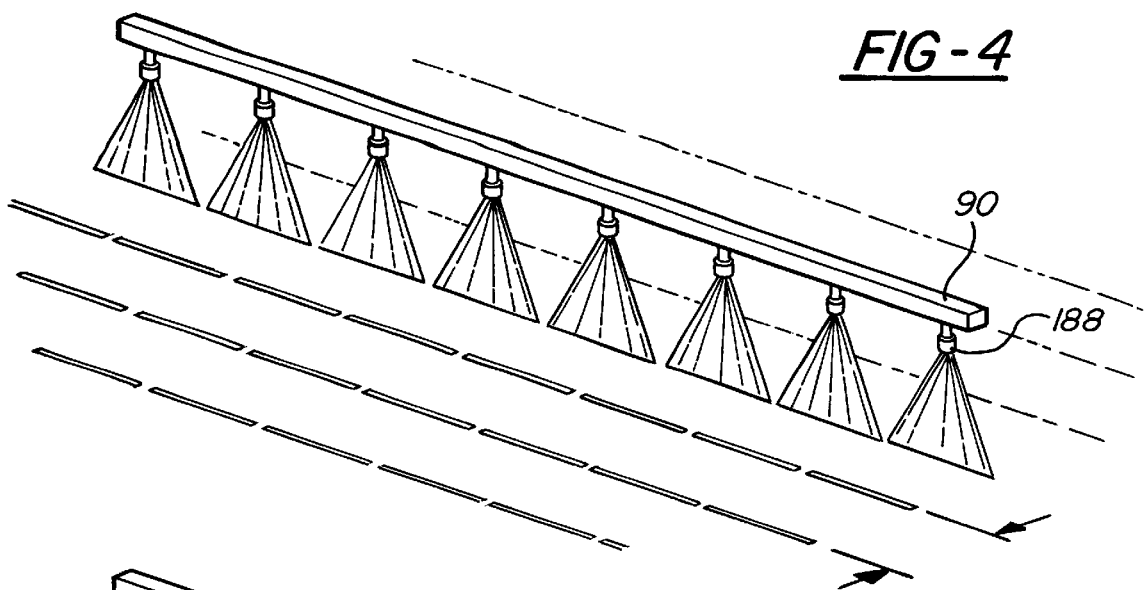
Figure 5:
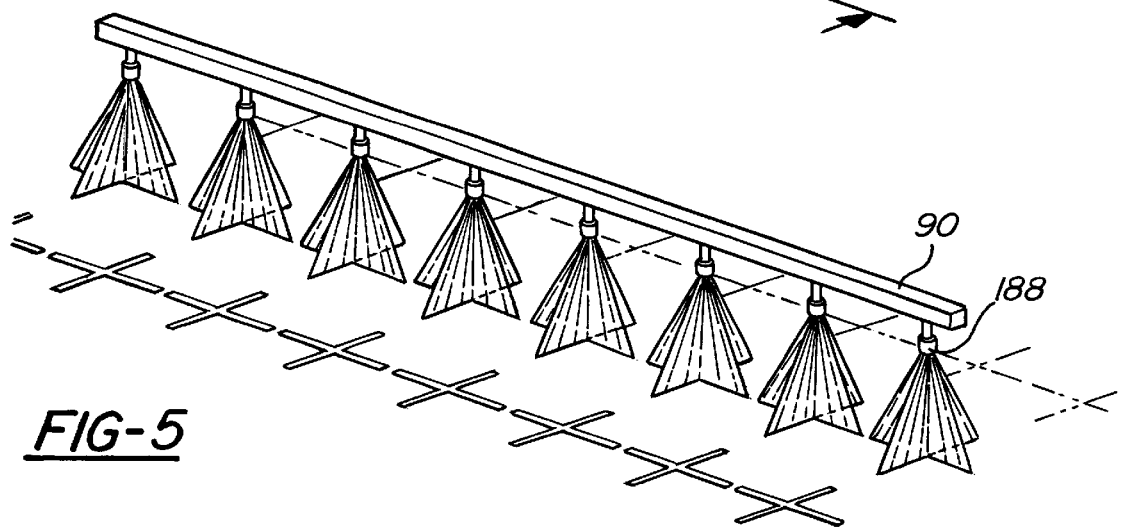
Figure 6:
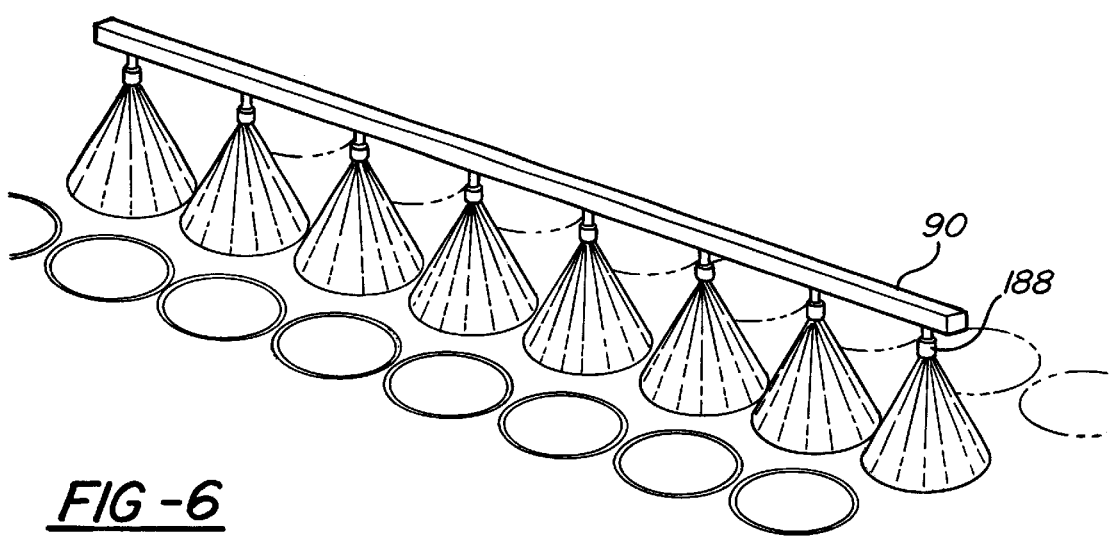

FIG. 3 shows a first embodiment of the seed-fluid mixture injection system of the present invention, which is scaled in size in order to serve as a turf seed injection system. The device includes storage tank 12 having agitator 13 for agitating the fluid and seed mixture. Agitator 13 can take any suitable form including a mechanically-driven rotating paddle or fluid jet system. As can be appreciated, fluid can be passed to storage tank 12 through input line 16 or through the tank cover 17. Dry materials such as seeds, as well as dry fertilizer that is to be rapidly dissolved within tank 12, can be placed within the tank's opening 17. Pump 50 may be a positive displacement high pressure pump with a delivery or output of 8 g.p.m. at 3,500 p.s.i. Pump 50 is used to transfer the fluid from tank 12 to the accumulator 60. A charge of the high pressure liquid builds up in the accumulator 60 until a predetermined pressure has been reached. At this point, the valve 80 opens allowing the accumulator fluid to flow through the flow lines to the manifold apparatus 90 and through the nozzles 188. It must be noted, that the nozzles 188 are of a fan, cross or cone configuration. Further, these nozzles are displaced from about 4 inches to about 8 inches and preferably 6 inches above the ground. FIGS. 4, 5 and 6 show envisioned distribution patterns of the high pressure ejected fluids 122. The manifold 90 and corresponding nozzles 188 are shown 6 inches (about 15 cm) above the ground. This particular arrangement in combination with a 6 cubic inch accumulator allows for the proper pressure and fluid volume to allow for grass seeds to be distributed at a depth of ¼ inch (about 6 mm) in the turf.

FIG. 4 shows a fan nozzle configuration discharging to form a dashed line spray pattern. As can be seen, the spray pattern is repeated at from 1 to 3 and preferably 2 inch (5 cm) intervals to allow for the proper propagation of the new seeds. This distance may be modified especially if different species are being planted.

FIG. 5 shows manifold 90 and nozzle assembly 188 having nozzles configured to distribute the high pressure grass seed-fluid mixture 122 in a cross-hatch pattern. It is envisioned that the use of a cross-hatch pattern in combination with a larger accumulator, 12 cubic inches or 20 cubic inches, will allow for a single sweep seeding of an area as opposed to using multiple passes.

FIG. 6 shows the use of a conical distribution pattern for the distribution of seeds within the turf grass. As with the cross-hatch pattern, it is envisioned that the conical distribution pattern will allow for a single pass to reseed an area. Note that we envision that still other distribution patterns may be used to inject the seed-fluid mixture into the ground, such as but not limited to oval patterns, star patterns and hexagonal patterns.

Figures 7, 8:
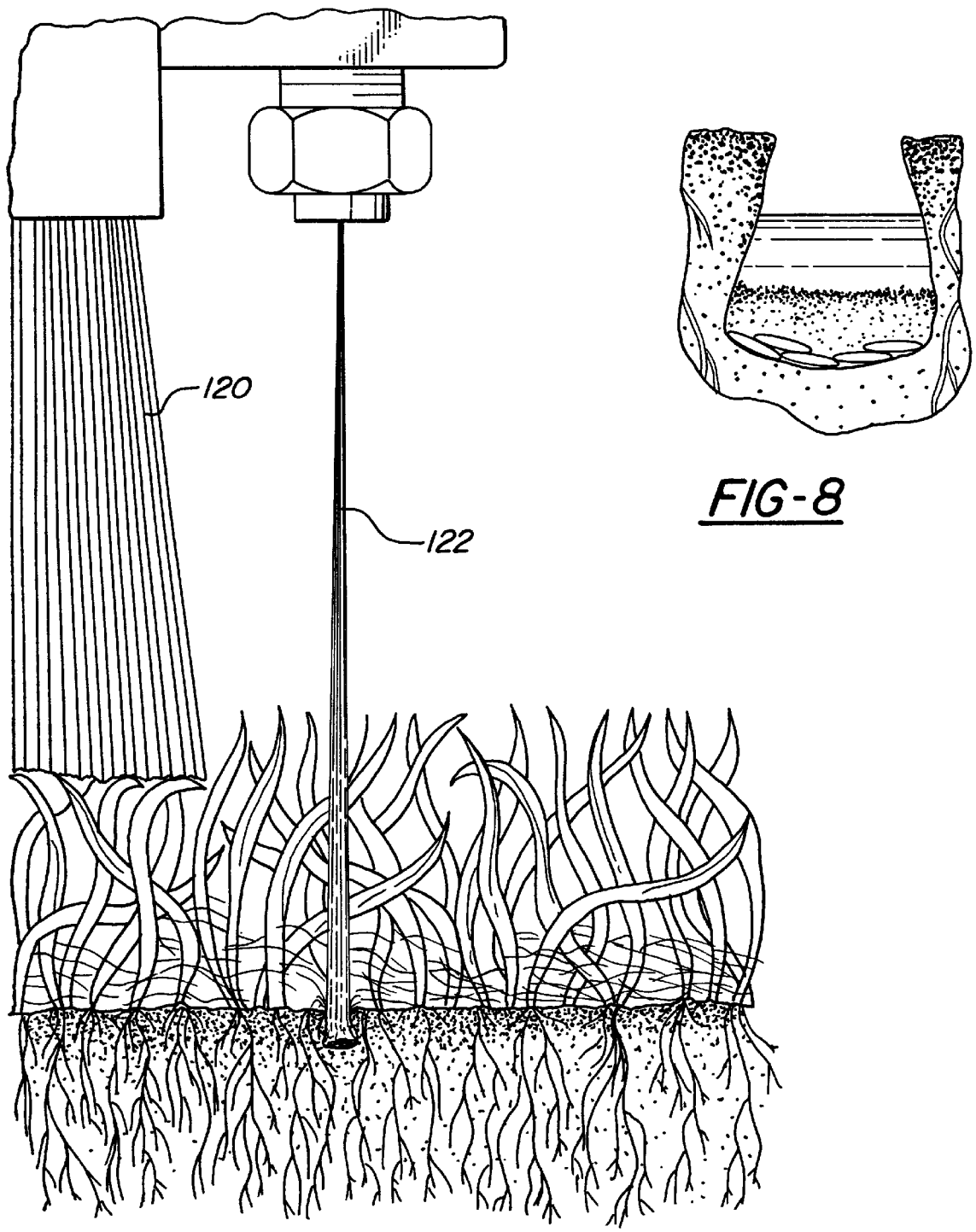
FIG. 7 shows a close-up view of a nozzle discharging the liquid-seed mixture into the ground.
FIG. 8 shows a cross-section of the seed-fluid mixture injected into turf environment.
Figure 11:
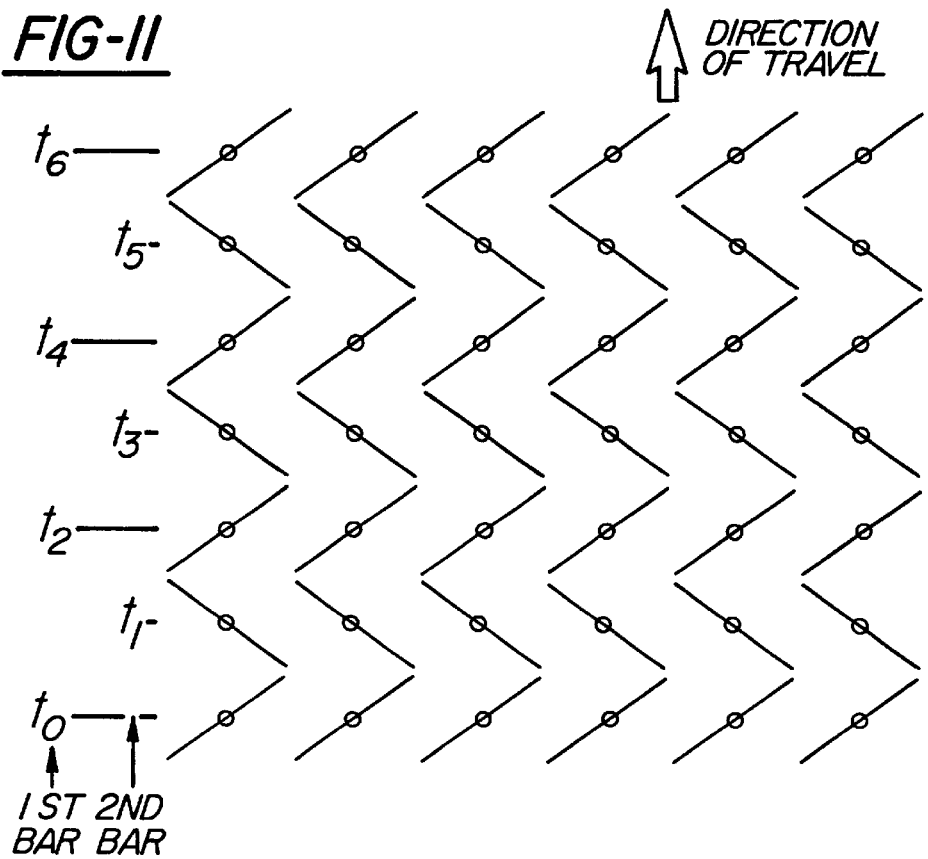
Figure 12:
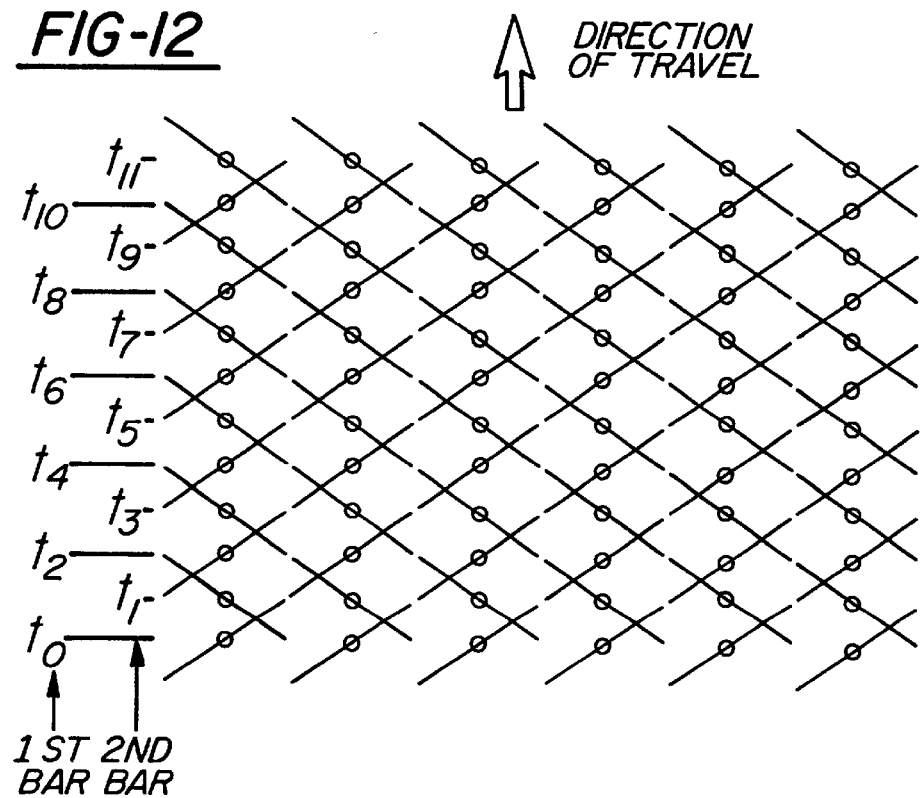

FIG. 7 shows a side view of a nozzle injecting the fluid-seed mixture into turf grass. As can be seen, the nozzle is about 6 inches above the ground. Further, the stream of the liquid-seed mixture passes or cuts through the grass and thatch to a depth of about 3 inch into the soil. As shown, the existing root structure of the grass material, which is mostly below this depth of injection, is not significantly adversely affected by the injection of these seeds. This allows for the continued life of these elongated thick grasses although they may be stunted due to the injection process. Further shown are bank of brushes 120. These brushes sweep any debris generated by the injection process deeper down into the existing turf. The row(s) of brushes also help guard against accidental encounters by persons with the high pressure jets 122. In other words, the brushes 122 form a physical barrier that makes it much more difficult to accidentally place any part of the body, such as one's foot, hand or even fingers, directly under the high pressure jet stream of liquid emanating in periodic bursts from the nozzles.

FIG. 8 represents a sectional view of the seed-fluid mixture after being injected into the ground using a fan type nozzle. As can be seen, the seeds are placed at an appropriate depth with respect to the soil surface and thatch material. Furthermore, optional dissolved polymer materials may also be delivered with as part of the liquid injection jet. In this manner, the hydrated polymer materials are in a close vicinity to the seeds to help assure that proper water/moisture levels are maintained early in the seed's growth cycle for near-optimal germination.

It is envisioned that the system can be incorporated into a walk-behind unit. In order to have the most successful walk-behind unit, or for that matter, a successful riding unit, it is preferable to have a uniform ground speed at a relatively low velocity, because the mechanical sprayer unit, by the latest design, operates to spray another burst every few tenths of a second. In other words, the spacing is typically on the order of 0.25 inch between the parallel rows of slits to up to 2.0 inches between the parallel slits. In this manner, the applicator can be used for re-seeding projects (where the unit is typically set for greater spacing), or new seeding projects (which would typically be at smaller spacings), to help bring in denser seed cultivar growth.

Rather than having a uniform wheel speed, the firing of the mechanism can be triggered by the amount of ground covered. This could be accomplished by utilizing wheel or drive shaft monitoring sensors 93 that actuate the seed injector upon a predetermined rotation of the vehicle's wheel. Care must be taken so the accumulator 60 has sufficient charge for a proper injection. However, in the present embodiment, a mechanical spring/accumulator arrangement is used to produce required spray bursts every 0.1 seconds to every 0.3 seconds, depending upon what is desired.

Further spraying patterns are possible. For example, if the nozzles having a slit-like pattern are turned diagonally, then a spray pattern of the type illustrated in FIG. 9 is developed. Basically, the spray bar injects the liquid-seed mixture into the ground at time intervals t1, t2, t3, t4, and t5. Since the vehicle holding a spray bar is moving forward, the spray pattern shown in FIG. 9 results. The angle A between the major axis of the spray bar and diagonal spray pattern is shown to be about 35 degrees, but this angle can be put at any suitable angle between a range of about 0 degrees and about 75 degrees, with a range between about 20 degrees to about 60 degrees being preferred, and with in the range of 30 degrees to about 45 degrees being most preferred. Obviously, this angle A can be flipped in mirror image fashion around the axis of the arrow representing the direction of travel. The spacing of the spray patterns can be altered by slowing down or speeding up the speed of the vehicle, or by changing the frequency or speeding with which the shots of liquid/seed mixture periodically issue from the nozzles. One of the advantages of the diagonal spraying patterns is that a denser spray pattern with heavier seeding per unit area may be achieved. However, more nozzles per unit length of spray bar may be required as the angle A is increased. Increased spray density may be achieved by slowing down the vehicle carrying the spray bar, or speeding up the frequency of the injector shots.

Further spray patterns are possible, as shown in FIGS. 10, 11 and 12, by using a pair of spray bars arranged in parallel so that the two rows of nozzles are spaced a determined distance D from one another (see FIG. 3*a*). The benefit of the double spray bars or manifolds 90 and 90' is that the following spray patterns may be achieved: a single cross stitched pattern as shown in FIG. 10; a zigzag pattern as shown in FIG. 11, and a double cross stitched pattern as shown in FIG. 12.

As can be seen in FIGS. 9 through 12, each sprayer bar will spray at a predetermined time per unit distance of travel. FIGS. 10 through 12 show the use of a tool sprayer bar pattern. As best illustrated in FIG. 11, the first sprayer bar is initiated at TO. After a predetermined time interval T1, the accumulator 60 releases a burst of liquid to the second sprayer bar. Alternately, the intervals between the actuation of the first and second sprayer bar can be keyed to the distance traveled by a control system which monitors determining as a function of wheel rotation.

As shown in FIG. 3*a*, the double spray bar arrangement 90 and 90' has a single high-pressure pump and two accumulator systems. A diverter valve 92 alternately directs the liquid-seed mixture to the first spray bar 90 and then to the second spray bar 90', then to the first spray bar 90, then to the second spray bar 90', and so on.

The benefit of using two sprayer bars, each with its nozzles turned diagonally, preferably in equal and opposite directions, is that a one-pass spraying system is provided which has an interwoven or cross-stitched pattern. As can be seen, there are two elongated sprayer bars 90 and 90', each having a plurality of nozzles 188, with each nozzle 188 injecting liquid including seed into the ground on a diagonal line with respect to the direction of travel. This spraying system is more efficient than making two passes over the ground.

One of the benefits of the cross stitched pattern and the double-cross stitched pattern is that each of the areas of overlap represents a small portion of turf which has been cut up by two slit-like high-pressure sprays. This in turn provides a more intense pruning or cutting back of the grass blades and upper root structure of the existing turf stand. This in turn gives the seeds injected into this area a slightly greater exposure to light, and slightly less competition from the existing turf stand. The net result is that the planted seeds may grow better in this area immediately surrounding the "X" or crosshatched area, than in areas just a few centimeters away where the cross-hatching is not provided has not occurred.

Another benefit of the cross stitched pattern is that it eliminates the need to traverse a golf course green from two different perpendicular directions in order to obtain substantially complete coverage. In other words, only one-passes over the turf need be made, rather than two-complete passes. This in turn reduces the amount of time which the heavy vehicle carrying the seed-injector equipment needs to spends on the turf, thus helping minimize compaction of the soil. It also reduces by half the amount of time the re-seeding action takes to perform.

The amount of energy required to inject seed to a certain depth into the ground or the existing turf stand depends in part upon the density of the existing turf stand, including the amount of thatch present, and the type of turf, and the type of soil. For example, dry sandy soil can be expected to permit to deeper injection then a comparable sample of dry heavy clay-laden soil. Having the latter type of soil being very moist may help make penetration of the seed into the soil easier. As operators of the equipment of present invention gain experience with the equipment, they can adjust the injection pressure to achieve optimal placement depth for the seed.

EPILOGUE

Those in the art should appreciate that the seed injection system and methods of the present invention may be used with other vehicles including tractors and other lawn care equipment. Also, the seed injection systems and methods disclosed herein can be profitably used for other planting applications such as the planting of cash crops.

Thus, it is to be understood that the seed injection devices of the present invention are by no means limited to the particular construction and uses herein disclosed and/or shown in the drawings. Instead, the present invention also encompasses many modifications or equivalents that are fairly covered by the claims set forth below.

We claim:

1. A system for injecting a liquid-seed mixture into soil having:
    a nozzle,
    a seed-fluid mixture;
    an accumulator for storing the seed-fluid mixture under pressure coupled to the nozzle;
    a pump for increasing the pressure of the liquid-seed mixture; and
    a regulator for regulating the flow of the seed-fluid mixture from accumulator through the nozzle, wherein the nozzle is configured to inject the fluid seed mixture into the soil.

2. The mechanism of claim 1 further comprising:
    a fluid supply; and
    a seed supplier for mixing the seed with liquid stored within the fluid supply.

3. The mechanism of claim 2 further containing an agitator for mixing the seed within the liquid.

4. The mechanism of claim 3 wherein the accumulator has a volume from about 5 to about 20 cubic inches.

5. The mechanism of claim 4 wherein the accumulator has a volume from about 6 to about 12 cubic inches.

6. The mechanism of claim 5 wherein the accumulator has a volume of about 6 cubic inches.

7. The mechanism of claim 3 wherein the nozzle discharges the liquid-seed combination in a fan pattern.

8. The mechanism of claim 3 wherein the nozzle is disposed from about 4 to about 6 inches above the ground.

9. The mechanism of claim 3 wherein the liquid is water.

10. The mechanism of claim 9 wherein the liquid further contains a dissolved fertilizer solution.

11. The mechanism of claim 9 wherein the liquid further contains a dissolved polymer material.

12. The mechanism of claim 3 wherein the seed is bent grass seed.

13. A high-pressure liquid-seed injection ("HPLSI") system for injecting a seed-liquid mixture into the ground comprising:
    an injection nozzle for directing periodic amounts of a seed-liquid combination into the ground;
    a liquid supply system for providing pressurized liquid to the injection head;
    a seed supplied system for introducing seed to a liquid before the injection nozzle;
    a metering mechanism for controlling the amount of liquid discharged by the nozzle; and
    a controller being operatively coupled with the metering mechanism to control the amount of fluid being discharged.

14. The mechanism of claim 13 wherein the liquid supply system contains an accumulator for accumulating the pressurized liquid having a volume from about 5 to about 20 cubic inches.

15. The mechanism of claim 13 wherein the liquid supply system further includes a pump for pressurizing the seed-liquid mixture and transporting the seed-liquid mixture to the accumulator system.

16. The mechanism of claim 13 wherein the liquid is water and contains at least one of; fertilizer, dissolved polymer, and bent grass seed.

17. The method of injecting seed into the ground comprising:
    producing successive jets of a liquid-seed mixture;
    directing successive jets of the liquid-seed mixture towards the ground at spaced intervals along a path of travel, the intervals between successive jets being related to the distance traveled along the path of travel.

18. A method for planting seed within soil comprising:
    creating a source of a high pressure seed-liquid mixture;
    periodically injecting jets of the seed-liquid mixture from above the soil into the soil at a pressure which will cause distribution of the seeds within the soil;
    moving the source of the liquid seed mixture over the surface of the soil in a pattern such that the dispersion of the seeds from adjacent jets co-act with one another to allow proper seed germination densities.

19. The seed planting method of claim 18 further comprising injecting the periodic jets through a plurality of nozzles, the nozzles dispensing the liquid in a fan pattern.

20. A seed planting method as described in claim 19 wherein the nozzles are spaced from about 2 to about 10 inches above the soil.

21. A seed planting method as described in claim 19 wherein the nozzles are spaced from 4 to 8 inches above the soil.

22. A method of injecting a seed liquid mixture comprising:
    providing a source of substantially incompressible fluid;
    providing a source of seed;
    mixing the incompressible fluid with the seed to form the seed-liquid mixture;
    compressing the seed-liquid mixture; and
    periodically injecting individual jets of the seed-liquid mixture into the soil wherein the individual jets contain a plurality of seeds suspended within the liquid.

23. The seed planting method of claim 22 wherein the jets are disbursed through a plurality of nozzles and the nozzles are spaced from about 2 to about 10 inches above the soil.

24. The seed planting method as described in claim 23 wherein the jets flow through a nozzle and the nozzles are spaced from 4 to 6 inches above the soil to be treated.

25. The seed planting method as described in claim 22 wherein the jets are disbursed in a conical shape.

26. A seed planting method as described in claim 22 wherein the jets are disbursed in a cross pattern.

27. A liquid-seed injection ("LSI") system for simultaneously injecting multiple seeds into the turf or ground to a desired planting depth over a distributed area using high-pressure ("HP") streams of liquid-seed mixture, comprising:

a tank in which seed to be planted and liquid is mixed;

an agitator for mixing seed and liquid in the tank;

a manifold having a first fluid passage for receiving the mixed liquid;

a first pumping device for delivering mixed liquid from the tank to a first fluid passage;

a second pumping device for pressurizing to a high-pressure state above 1500 psi the liquid-seed mixture delivered to the first fluid passage;

an air-over-liquid accumulator in fluid communication with the first fluid passage for temporary storage of liquid-seed mixture therein;

a sequencing valve mechanism in fluid communication with the first fluid passage for repetitively producing, in combination with the accumulator and second pumping device, a high-pressure stream of liquid-seed mixture which is shorter than about one-half second in duration;

elongated header having at least a first set of ports for receiving high-pressure spray nozzles, the first ports being substantially uniformed spaced along the header;

a first set of substantially identical spray nozzles each having an orifice and a pre-determined spray pattern, each of the spray nozzles being rigidly mounted to a corresponding one of the ports in the first set of ports, the spray nozzles each having an orifice and a central vertical axis extending downwardly therefrom, each spray nozzle being arranged to produce a spray pattern that substantially diverges from the vertical axis of the spray nozzle, whereby a fan-shaped spray is produced when a stream of high-pressure liquid-seed mixture is forced therethrough, and a support mechanism for holding the first set of nozzles being positioned a predetermined distance of at least about three inches above the ground into the liquid-seed mixture is to be injected.

\* \* \* \* \*

UNITED STATES PATENT AND TRADEMARK OFFICE
CERTIFICATE OF CORRECTION

PATENT NO. : 6,431,096 B1
DATED : August 13, 2002
INVENTOR(S) : Milton C. Engelke et al.

It is certified that error appears in the above-identified patent and that said Letters Patent is hereby corrected as shown below:

Column 3,
Line 6, "steam" should be -- stream --

Column 4,
Line 14, "protects" should be -- protect --
Line 30, delete "and"

Column 9,
Line 4, "valves" should be -- values --
Line 61, insert -- storage tank -- before "112"

Column 10,
Line 6, "tank 12" should be -- tank 112 --
Line 8, "substantially" should be -- substantial --
Line 17, "vehicles" should be -- vehicle's --

Column 11,
Line 11, "inch" should be -- inches --
Line 21, "brushes 122" should be -- brushes 120 --

Column 12,
Line 5, "with in" should be -- within --
Line 66, delete "is not provided"

Column 13,
Line 4, "one-passes" should be -- one pass --
Line 5, "two-complete" should have no hyphen
Line 7, "spends" should be -- spend --
Line 19, after "of" insert -- the --
Line 49, "nozzle," should be -- nozzle; --

Column 14,
Line 30, "of;" should be -- of: --

UNITED STATES PATENT AND TRADEMARK OFFICE
CERTIFICATE OF CORRECTION

PATENT NO. : 6,431,096 B1
DATED : August 13, 2002
INVENTOR(S) : Milton C. Engelke et al.

It is certified that error appears in the above-identified patent and that said Letters Patent is hereby corrected as shown below:

Column 16,
Line 9, "uniformed" should be -- uniformly --
Line 25, delete "is"

Signed and Sealed this

Twenty-fifth Day of February, 2003

JAMES E. ROGAN
*Director of the United States Patent and Trademark Office*